Feb. 19, 1935.　　　N. BREWER　　　1,991,490
CENTRIFUGAL SEPARATION
Filed Dec. 24, 1931　　　5 Sheets-Sheet 3
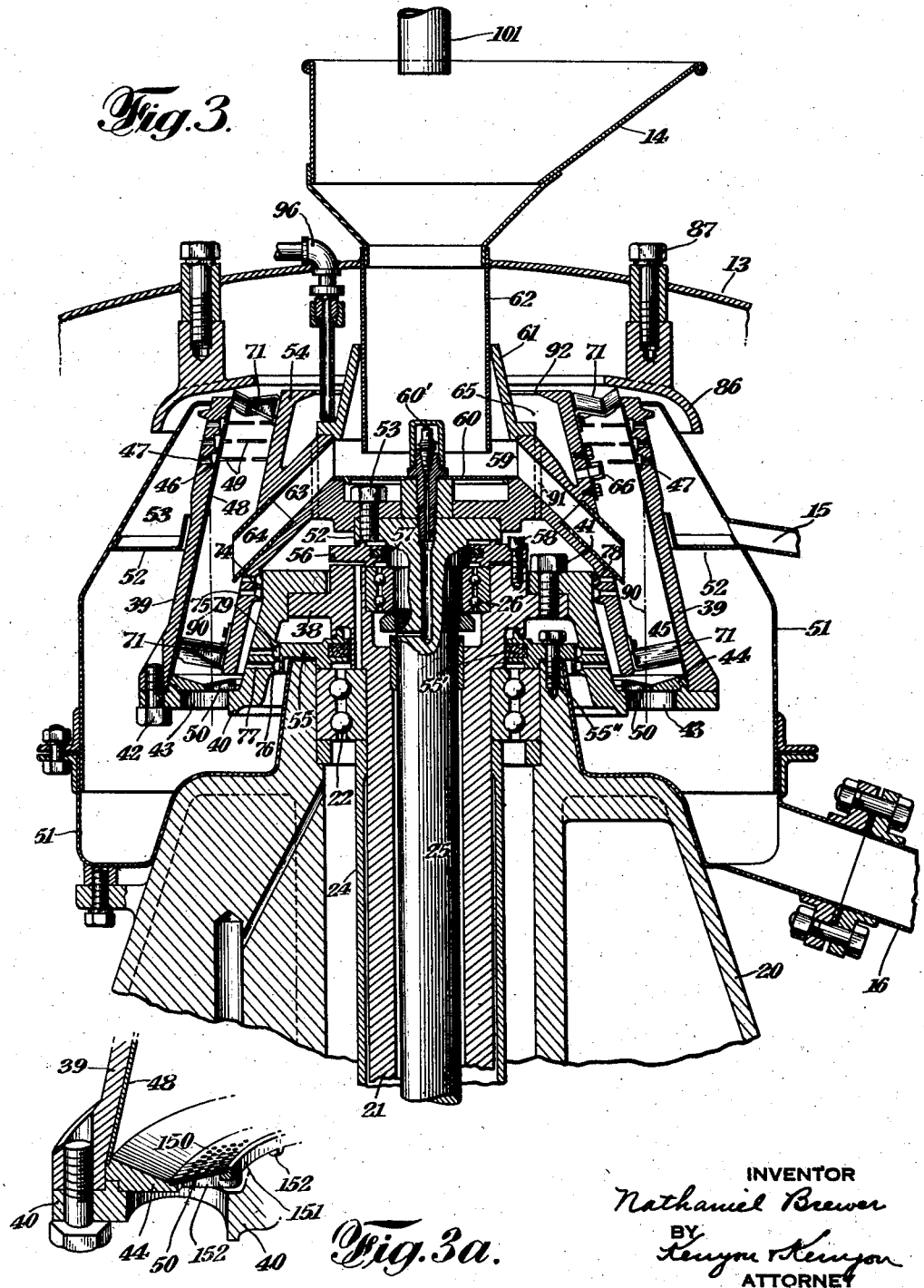

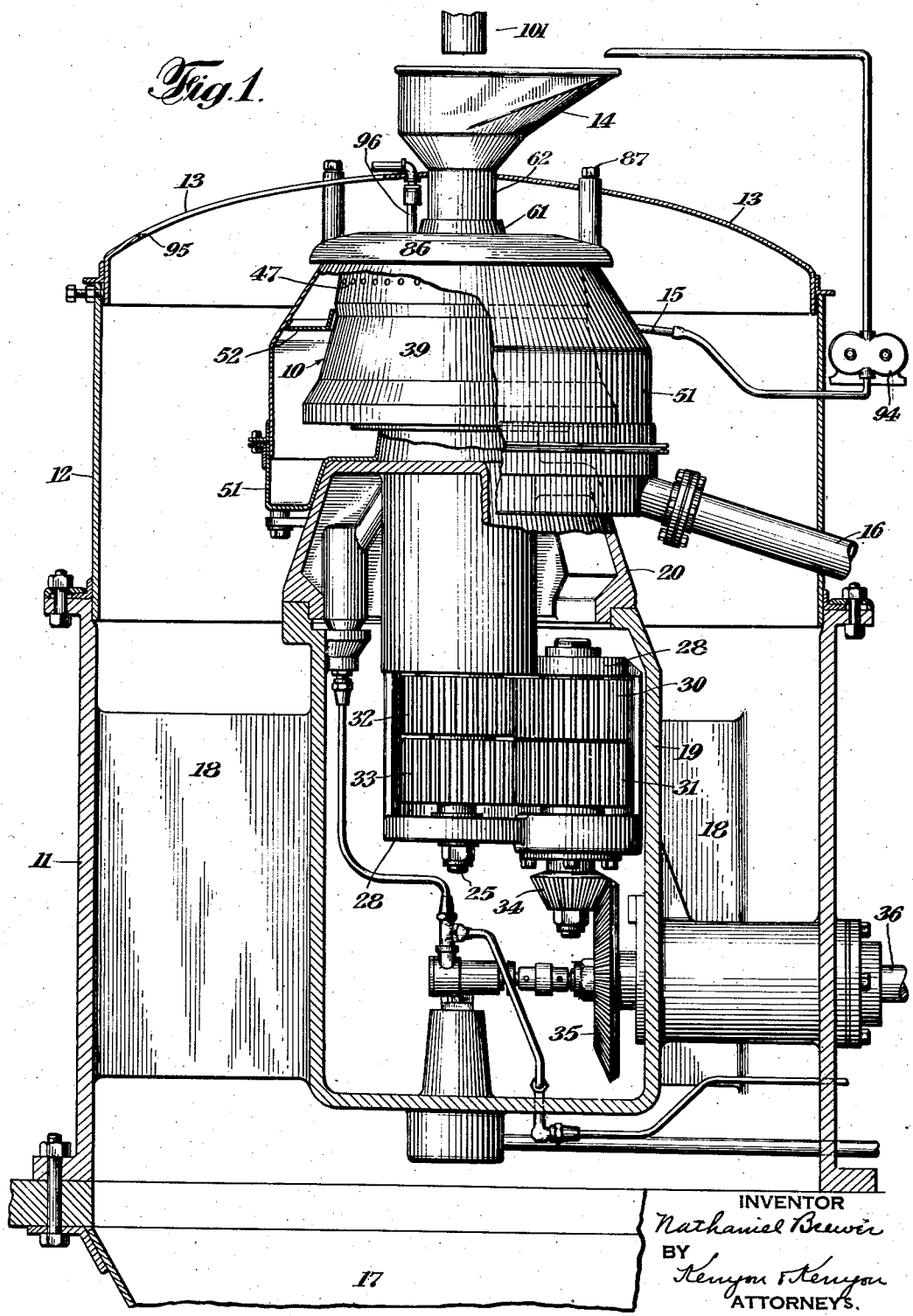

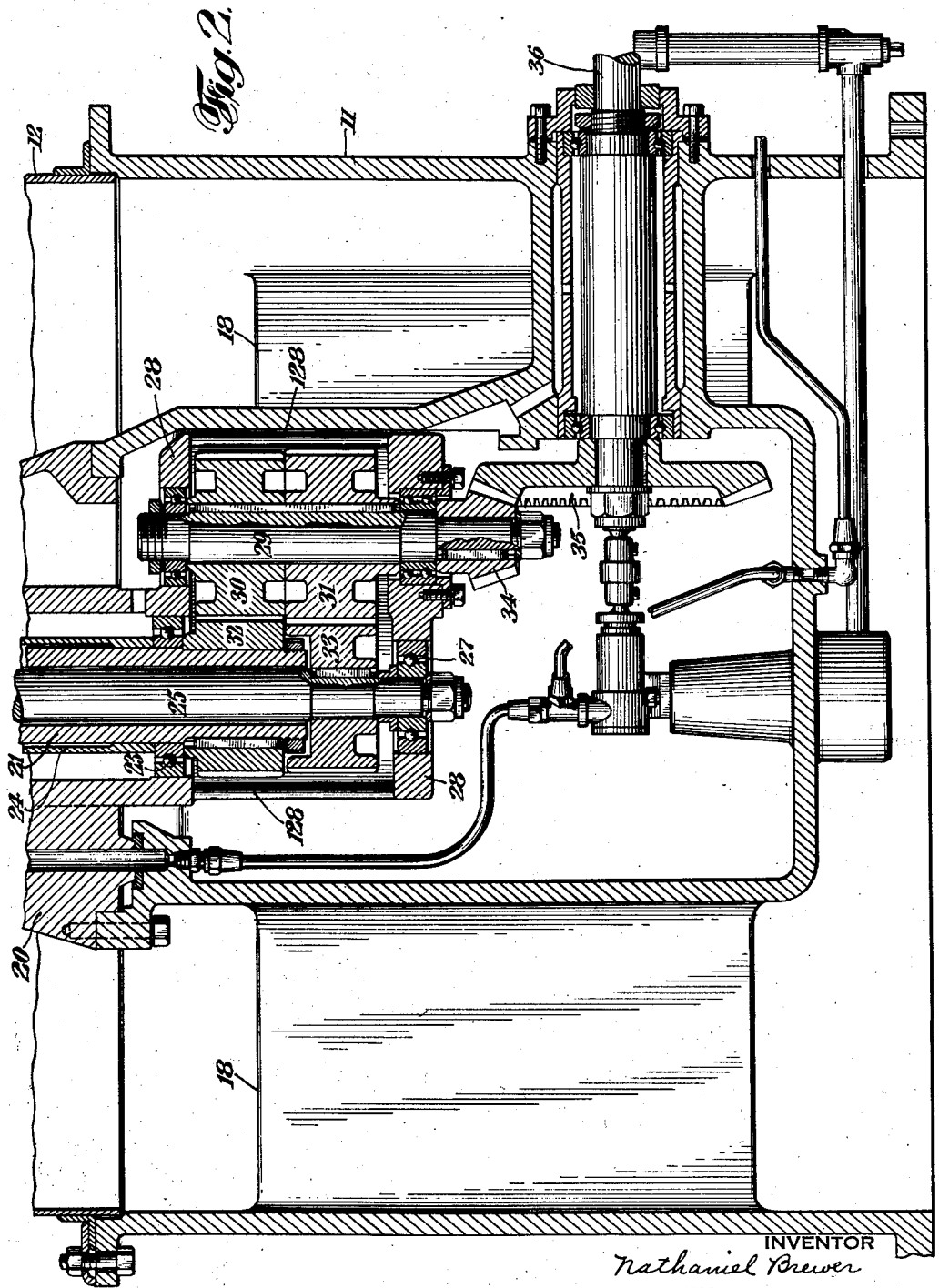

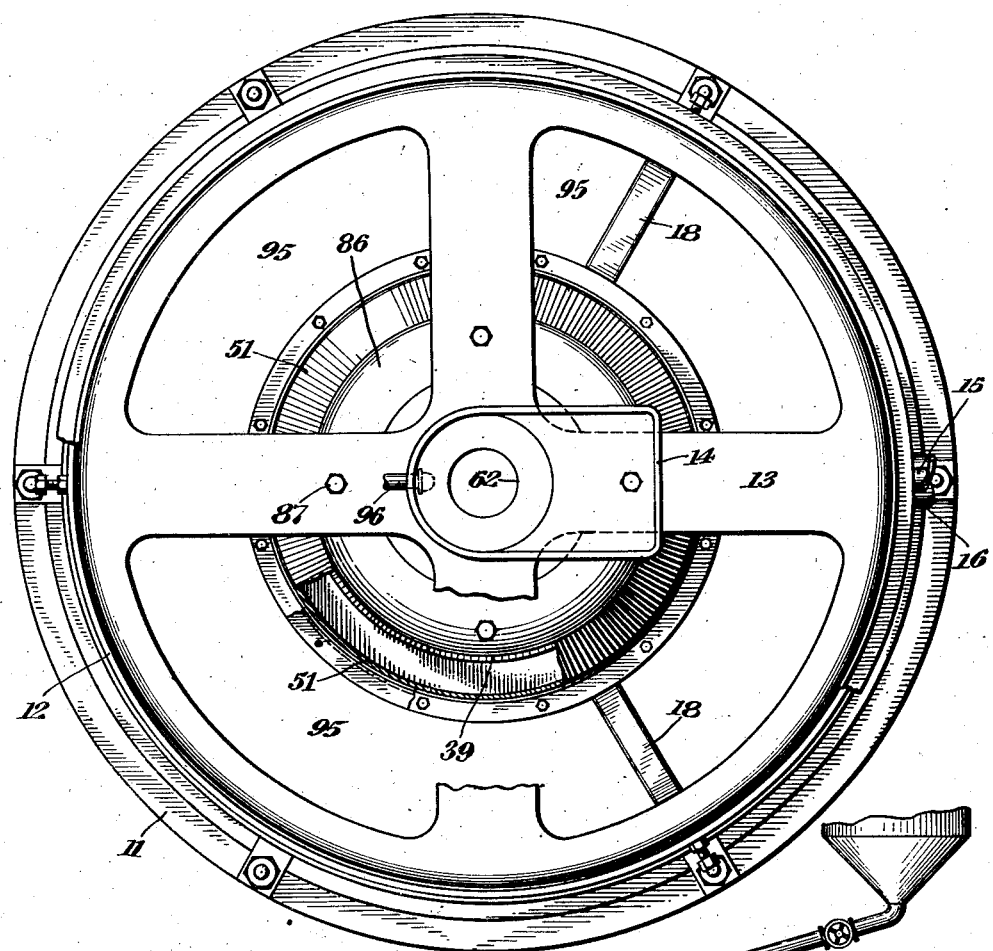
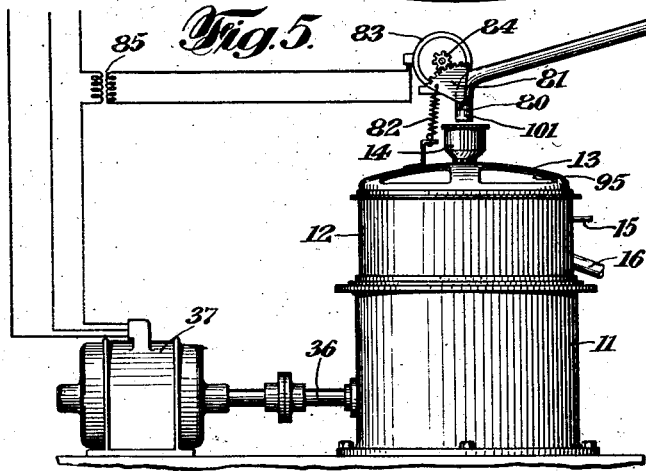
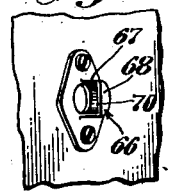

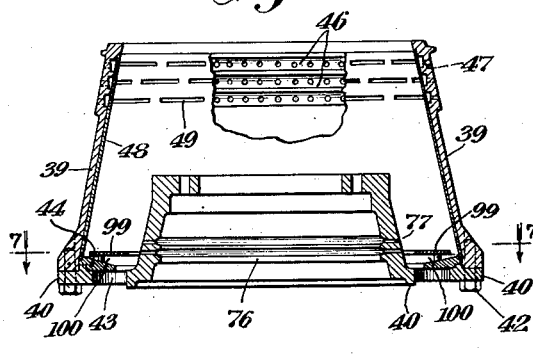
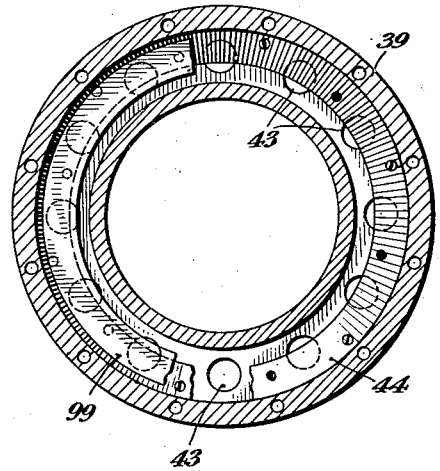
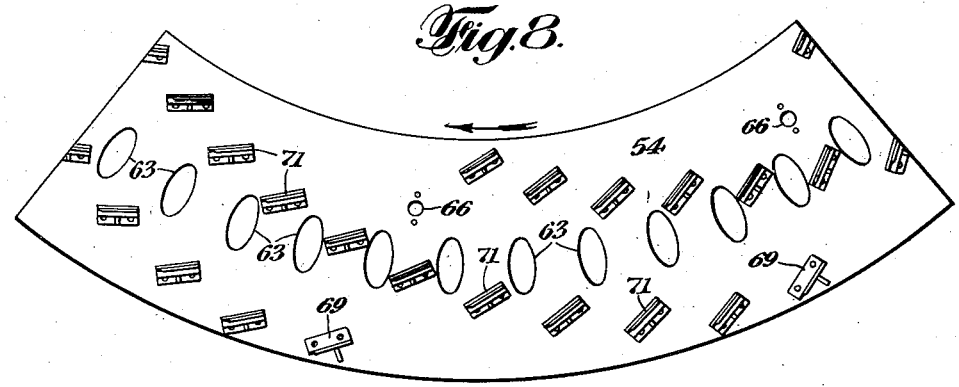
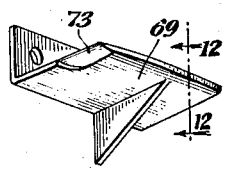
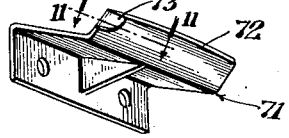
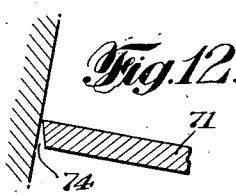

Patented Feb. 19, 1935

1,991,490

UNITED STATES PATENT OFFICE 1,991,490

CENTRIFUGAL SEPARATION

Nathaniel Brewer, Lansdowne, Pa., assignor to The Sharples Specialty Company, Philadelphia, Pa., a corporation of Delaware Application December 24, 1931, Serial No. 582,902

5 Claims. (Cl. 210—69)

This invention relates to a method and apparatus for effecting centrifugal separation into their constituents of mixtures comprising one or more liquids and a solid or semi-solid constituent.

It is possible to effect on a commercial scale centrifugal separation of solids from liquids mixed therewith, but there has not been developed a machine suitable for commercial use which effects such a separation and effects also a continuous discharge of the separated solids and which is accordingly suitable for continuous operation. A feature of this invention is that continuous separation of solids from liquid and continuous discharge of solids from the centrifugal rotor is effected and the machine is suitable for continuous operation on a commercial or industrial basis.

A further feature of this invention is that mixtures of solids with liquid are first subjected to sedimentation or decanting under the action of centrifugal force in an imperforate rotor or rotor zone in which separation by difference of specific gravity is effected, and the solids are continuously discharged.

A further feature of this invention is that after the mixture has been subjected to decanting or sedimentation which effects a separation by difference of specific gravity, the solids are withdrawn from the decanting step but retained for a limited period within the influence of centrifugal force; a further feature of this invention being that such withdrawal of solids from the decanting step is mechanically effected preferably by the positive application of force through the medium of solid-advancing elements, as by plows which may be differentially rotated with respect to the rotor.

A further feature of this invention is that solids withdrawn from the decanting step are subjected to a washing treatment under the action of centrifugal force prior to their discharge from the rotor. A further feature of the invention is that solids are washed under the influence of centrifugal force by causing the wash-liquid to move in a direction opposite to that in which the solids are being advanced toward their point of discharge from the rotor, a further feature of the invention being that the solids are caused to lie during the washing thereof upon a conical surface which diverges from the zone or portion of the rotor from which the solids are discharged. The result is that countercurrent washing and all of the advantages thereof are secured in the washing step. A further feature of this invention is that the solids, removed from the step in which separation is effected by difference of specific gravity, are subjected to a centrifugal straining operation in a rotor or a zone of a rotor having a perforate wall. A feature of this invention is that liquid is continuously discharged from the rotor during the separation that is due to difference of specific gravity; and a further feature of the invention is that the solids passing from the decanting step to the straining step are moved over a frusto-conical draining surface that diverges toward the decanting zone and converges toward the straining zone; and accordingly a further feature of this invention is that the solids, subjected to the straining operation, have been previously freed of a major portion of the liquid mixed with them. If the solids removed from the sedimentation or decanting operation are subjected to washing between the time they are removed from the sedimentation operation and the time they are introduced into the straining operation, the employment of a washing operation having the features above stated ensures that the solids passed to the straining operation will be largely freed of liquid in spite of the addition of wash-liquid to the solids after they are removed from the decanting operation. One result of the extensive removal of original liquid from the solids prior to the washing thereof, and of effecting washing by countercurrent flow is that relatively little wash water is required to effect extensive or substantially complete removal of original liquid from the solids. One result of the extensive removal of liquid from the solids prior to subjecting the solids to a centrifugal straining operation, is that a relatively small proportion of the fine particles of solids is carried through the openings in the wall of the rotor because such loss of fine particles largely is due to flow of liquid through the solids and through the openings in the wall of the rotor, but there is a relatively small flow of such liquid.

Another feature of this invention is that by first subjecting the mixture to sedimentation or decanting in which separation is effected by difference of specific gravity there are separated from the desired solids of the mixture lighter liquid and solid impurities, additional to the major constituents of the mixture, and fine particles which may have higher specific gravity than the liquid but which normally remain or are caused to remain suspended therein, such fine particles being undesirable in the final solid product either because of their size or because they are impurities or because they are abraded from the surface of the desired solids and carry impurities which collected on such surface. This feature is a great advantage in connection with the recovery of ammonium sulphate crystals from acid liquor in which they are formed, as in gas plants, because tar in the mixture to be separated is floated out of the rotor on the acid liquor and fine solid impurities are carried out of the rotor in suspension in the acid liquor, whereas recovery of the crystals in a mere straining operation results in the tar and fine impurities being caught on the crystals as the liquid flows through them to the openings in the rotor wall. This feature also resides in the recovery of salt crystals from brine in accordance with this invention in that a substantial proportion of common impurities of salt such as calcium sulphate and calcium and magnesium carbonates are carried out in suspension in the liquid removed from the salt crystals by sedimentation or decanting. Again, this feature resides in the recovery of gluten from brewers' grains in accordance with this invention in that the gluten is carried out of the rotor in suspension in the liquid discharged from the decanting step and in that way separated from the other solids including starch which are retained in the rotor until they are separately discharged. This invention is not limited to the use of this feature in the foregoing examples.

A further feature of this invention is that the liquid discharged from the rotor, through the openings in the wall thereof, in the straining operation, may be collected separately from the liquid discharged from the rotor as a result of the decanting operation in which separation takes place by difference of specific gravity. One result of this feature is that that fraction of the liquid separated from the solids which contains valuable fine particles is a relatively small fraction of the total quantity of separated liquid; and a further feature of this invention is that the liquid recovered in the draining operation and containing valuable fine particles and being only a small fraction of the total separated liquid, is returned or recycled to the separating operations for the recovery of the fine particles contained therein, or returned to the operation in which the mixture is formed, e. g., a crystallizing operation. When the solids are recovered by a mere straining operation the fine particles lost through the wall of the rotor are contained in the entire body of separated liquid and it is impossible to recycle such liquid to the rotor or to the mixture-forming operation.

A further feature of this invention is that the openings in the wall of the rotor, or of a zone thereof, wherein the straining operation is performed, are annular slots which are relatively narrow in the direction of the axis of the rotor and are spaced relatively far apart in that direction, whereby the loss of fine particles through the wall of the rotor and the degradation or abrasion of the crystals is minimized and the power necessary to advance the solids across the screen is reduced.

Further features of this invention are that all or some of the operations comprising decanting, washing, draining and straining can be performed in a single rotor under the influence of centrifugal force; and the extent to which solids are maintained in suspension in the liquid in the decanting operation and discharged therewith can be controlled by regulating the rate at which mixture is fed to the rotor or regulating the agitation of the material in the decanting zone, as by parts carried by the plow support.

Another feature of this invention is that the solids are discharged centrifugally from the rotor and caused to impact, substantially at the velocity at which they are so discharged, against a stationary body; and it is a further feature of this invention that the solids are deflected by such stationary body into a direction which ensures an extended passage of the solids through air or a gas prior to further contact with a solid body such as a receptacle in which the solids discharged from the rotor are collected. Advantages of these features are that the velocity of the solids is slightly reduced and relatively wet and dry solids are mixed by contact with the stationary element at high velocity; the high velocity of particles moving across the deflecting plate prevents sticking or caking of the solids thereon; the traversing of the solids through the extensive path through air or other gas facilitates drying thereof and causes the particles to strike the wall of the collecting compartment at such low velocity that they do not stick to or cake thereon; and the flight of the particles sets up a drying circulation of air through a surrounding casing, the surrounding casing being provided to that end with openings through which air or gas is caused to circulate by the free movement of the solid particles.

A further feature of this invention is that the action of the washing liquid upon the solids to be washed is promoted by centrifugal force; and the liquid is applied to those solids by a nozzle so constructed that liquid discharging therefrom flows in a thin layer over a relatively long weir extending in the direction of the axis of rotation, with the result that restricted openings do not have to be employed for the purpose of distributing the liquid over the solids and clogging of the wash-liquid passages is eliminated and the liquid being in a thin relatively wide layer, or dispersed, is well distributed.

While this invention is not in any respect limited to the treatment of any specific substance but is effective in the treatment of numerous substances of varying characteristics, it is a feature of this invention that ammonium sulphate crystals mixed with acid liquor is subjected to sedimentation and then to washing and then to centrifugal straining with the result that the crystals recovered are purer and are markedly lighter in color as a result of freedom from tar than crystals recovered by mere straining; and the crystals discharged after sedimentation, washing and straining contain approximately 0.1% to 0.5% by weight on the moist salt, of moisture, and the crystals recovered in the practice of this invention are substantially neutral as a result of the rinsing and straining steps. By way of contrast, ammonium sulphate crystals obtained by mere centrifugal straining followed by centrifugal washing of the cake of solids retained in the batch-operated centrifugal strainer, have a moisture content of 2% by weight on the moist salt and an acid content of .05% to .15% by weight.

A further feature of this invention resides in controlling, in accordance with the power used in operating the centrifuge, the rate at which mixture is supplied to the centrifuge. When the practice of this invention involves advancing the solids along the rotor wall by means of plows mounted for differential rotation with respect to the rotor, from the decanting or sedimentation step to and through the straining step, a major portion of the power supplied to the machine, and nearly all of the power in excess of that required to drive the machine when nothing is fed thereto, is utilized in advancing the solids from the sedimentation step to their point of discharge, and it is a feature of this invention that the rate at which the mixture is fed is so controlled by the rate at which power is supplied to the machine that the rate of feed is somewhat inversely proportional to the rate of power supply. As a result solids are discharged from the machine at about the same rate regardless of variations in the proportion of solids to liquids in the original mixture.

A further feature of this invention is that naphthalene crystals recovered by subjecting a mixture comprising such crystals and the liquids with which such crystals occur in the usual commercial production of naphthalene, to sedimentation, washing and draining, in the manner above described, results in the continuous separation from the mixture of naphthalene crystals which are purer and may be expected to be drier and possess a higher melting point than crystals recovered from the liquids by centrifugal straining in the usual batch centrifugal strainer.

A further feature of this invention is that the continuous separation effected in accordance herewith permits of the use of a rotor having a diameter which is only a fraction (e. g. ¼) of the diameter of the rotor of the usual batch centrifugal strainers. Accordingly, for the same peripheral speed it is possible to obtain a centrifugal force which is three to twelve times as great as that obtainable in the usual batch centrifuges. Batch centrifuges must be unloaded whenever the load therein approximates 500 lbs. of solids and maximum stresses and pressures are encountered; but centrifuges embodying and operated in accordance with this invention and which discharge solids continuously, contain only a relatively small weight of material and stresses and pressures are relatively lower and cost of manufacture is lower, life of parts is longer and maintenance is less expensive; and the higher centrifugal force available effects the desired separations rapidly and permits feed of mixture at a high rate and the solids produced are dryer and purer and the amount thereof produced per day is up to or in excess of twice that produced by a batch centrifuge. Also, the continuous plowing of material across the straining surface maintains in a free and clear state the openings therein, as contrasted with the clogging of draining openings in batch centrifuges, which clogging requires stoppage and cleaning.

Obviously, the various features of this invention which are herein enumerated are susceptible of separate use but the conjoint use of two or more of said features results in benefits in excess of the sum of the benefits derived from the separate use of the features.

For the purpose of assisting in a further and better understanding of this invention there is described herein an illustrative embodiment of the features of this invention, with the understanding that this invention is not limited to the embodiment described; and other and further features and advantages of this invention will appear from a description of such illustrative embodiment.

In the drawings in which like reference characters indicate similar parts,

Fig. 1 is a vertical sectional view, with parts broken away, of centrifugal apparatus embodying my invention and whereby my invention may be practiced.

Fig. 2 is a partial vertical sectional view of the driving mechanism of the apparatus shown in Fig. 1.

Fig. 3 is a vertical sectional view, with parts broken away, of the upper part of the apparatus shown in Fig. 1.

Fig. 3a is a partial detailed perspective view of the rotor.

Fig. 4 is a plan view, with parts broken away, of the apparatus shown in Fig. 1.

Fig. 5 is a diagrammatic view of the feed-control mechanism.

Fig. 5a is a detail of the wash-liquid spray nozzle.

Fig. 6 is a vertical sectional view, with parts broken away, of a modified form of rotor.

Fig. 7 is a transverse sectional view approximately on line 7—7 of Fig. 6.

Fig. 8 is a development of the surface of the frusto-conical plow-carrying element, and Figs. 9 to 12 are detail views of plows, Fig. 11 being a section on line 11—11 of Fig. 10, and Fig. 12 being a section on line 12—12 of Fig. 9.

In the construction shown in the drawings, rotor 10 is mounted for rotation in an enclosing and supporting frame or casing comprising base 11, upper section 12 and cover 13. The centrifugal machine is provided with a feed hopper 14, and liquid outlets 15 and 16. Solids dried by the machine may be handled in any convenient manner, as by positioning the machine over an opening in the floor which supports it and allowing solids to drop from the casing into a hopper 17.

Within base 11 there is supported, as by webs 18, a casing 19, on which is supported an upper casing member 20. Hollow shaft 21 is supported in bearings 22 and 23 carried in upper casing 20, said bearings being spaced by sleeve 24. Within hollow shaft 20 is positioned solid shaft 25 which is supported at its upper end by bearing 26, positioned within hollow shaft 21, and at its lower end by bearing 27 which is carried in bearing support 28 which is joined to upper casing member 20 by webs 128. Jack shaft 29 is supported in upper casing 20 and support 28 joined thereto and has keyed to it gears 30 and 31 which engage respectively with gears 32 and 33 which are respectively keyed to hollow shaft 20 and solid shaft 25, the relation of the gear ratio of gears 30 and 32 to the gear ratio of gears 31 and 33 being such that solid shaft 25 is driven, upon rotation of shaft 29, at a slightly greater speed than hollow shaft 20. Bevelled pinion 34 keyed to shaft 29 is driven by bevelled gear 35 keyed to shaft 36 which may be driven in any suitable manner as by electric motor 37. Preferably, gears 30, 31, 32 and 33 are precision-ground in order that the necessary power may be delivered at the contemplated speeds of rotation, e. g. 1500 to 4000 R. P. M.

Hollow shaft 21 is provided at its upper end with an annular flange 38 to which is secured in any suitable manner a suitable centrifugal rotor, which in the construction shown comprises a side-wall 39 and a base 40 secured to flange 38 by a plurality of bolts 41, only one of which is shown in Fig. 3. Side-wall 39 and base 40 are joined in any suitable manner as by bolts 42 of which only one is shown in Fig. 3.

While the side-wall of the rotor is shown as being of frusto-conical configuration, it is apparent that modifications of that configuration may be employed in the practice of this invention.

Base 40 of the rotor is provided with a plurality of openings 43, and the position of the inner surface of liquid retained within the rotor may be determined by the position of the outer edge of these openings or by an annular dam 44 which has its inner edge concentric with the axis of rotation, and which may be replaced by dams having different internal diameters for varying the depth of liquid retained in the rotor. Dam 44 may or may not be provided at its inner peripheral edge with a screen 50 which retains solid particles but is self-clearing under the action of centrifugal force. For example, screen sections 150 may be soldered in place in the openings in the frame formed by ring 151 connected to arms 152 integral with dam 44.

Dam 44 forms with converging side-wall 39 a sedimentation or decanting compartment or zone or section 45, in that it retains in the rotor a body of liquid of which the position of the inner surface is determined by the radial distance of the inner edge of dam 44 from the axis of rotation.

A zone or section of the inner surface of the wall 39 of the rotor is provided with internal annular grooves 46 from which perforations 47 lead through the wall of the rotor. Preferably, wall 39 of the rotor is provided with an internal lining 48 which is provided with slots 49 which register with grooves 46, thereby causing the rotor or a section or zone thereof to effect straining of solids subjected to centrifugal force within the rotor.

Liquids discharged over dam 44 are collected, as in annular receptacle 51 from which leads liquid discharge passage 16. Within receptacle 51 is a partition or deck 52 which divides off compartment 53 into which is discharged liquids strained from solids in the straining or draining zone and from which liquid is withdrawn through liquid discharge pipe 15.

The upper end of shaft 25 is provided with a flange 52, to which is connected as by a plurality of bolts 53 of which only one is shown in Fig. 3, an inner frusto-conical member 54 which is differentially rotated more rapidly than the rotor by reason of the differential rotation between shafts 25 and 21. As a detail of construction, ring 55 carrying packing material 55', which bears upon the periphery of shaft 21, is secured as by screws 55'', to the top of upper casing 20; and ring 56 carrying packing material 57 which engages the periphery of shaft 25 is secured, as by screws 58, to the upper end of shaft 21. Within the central portion of inner member 54 there is formed a chamber 59 provided with a floor 60 which is held in place by capped oil cup 60' which provides lubrication through the passages indicated.

Inner member 54 is preferably provided with neck 61 leading into chamber 59 and into which the mixture to be separated is introduced from hopper 14 by tube 62. From chamber 59 the mixture is conducted to and distributed around the inner surface of the rotor by a plurality of feed passages 63 preferably provided with nozzles 64. Inner member 54 is also provided with an annular chamber 65 into which washing liquid is conducted through pipe 96 supported in any manner as in cover 13. Wash-liquid from chamber 65 is centrifugally distributed toward the inner wall of the rotor and upon solids thereon by means of nozzles 66, which, as shown in Fig. 5a, comprise trough-like members 67 closed at their outer end by wall 68. The open side of members 67 faces in the direction of rotation and the accelerating force acting on the liquid passing through nozzles 66 causes it to flow in the trough and the edge 70 which acts as a weir and under the action of centrifugal force distributes in an extremely thin layer the wash-liquid passing through nozzles 66 during rotation of the inner member in the direction shown by the arrows on the drawings.

Inner member 54 carries on its periphery two series of plows 71 symmetrically arranged with respect to the axis of rotation for the purpose of avoiding vibration and having the general configuration indicated in Fig. 10, which shows the under-side of the plow of which the essential features are that the turned-up edge 72 of each plow acts to turn over the solids in advancing them toward their point of discharge, and the sharpened edge 73 reduces the power required while the back-clearance 74 acts to prevent pulverizing of treated material and to reduce the power required. The use of a plow 69 of the type shown in Fig. 9 as the lowermost plow of each series makes it possible to advance solids upward from the lowermost part of the decanting zone. The plows are so arranged that each one takes up the material previously turned over by the next lower plow of the other series, to the end that the material lies undisturbed on the inner surface of the rotor during one-half of each differential rotation between the rotor and the inner member. Due to the differential rotation of inner member 54 with respect to the rotor, the plows will advance solids upwardly along the inner wall of the rotor; and the solids are finally discharged from the rotor by passing over the upper edge thereof. Due to centrifugal force the solids pass across the upper edge of receiving compartment 51 and strike against annular deflector plate 86, which is so close to the rotor that the solids move at high velocity when they engage it but which is of such configuration that the solids strike it tangentially or at a small angle and do not stick to it and are directed downwardly and traverse a long path through the air within the surrounding casing before they come into contact with the walls thereof. Cover 13 being provided with openings 95, the downward flight of the solids causes a draft downward in the casing and out through discharge hopper 17, acting to dry the solids. Deflector 86 may be supported in any manner as by means of bolts 87 passing through lugs in cover 13.

In the construction shown in Fig. 3 the inner member 54 is provided on its inner face with an annular surface 74 which closely engages the opposed annular surface of the base 40 of the rotor and is provided with grooves 78 from which lead openings 75, in order that liquid tending to pass upwardly between inner member 54 and that part of the base of the bowl which extends upward within the inner member, will be discharged into the rotor instead of working up into bearing 26. Similarly, the inner face of the upward extension of base 40 of the rotor is provided with an annular surface 76 which is closely positioned to the opposed annular surface of ring 54 and is provided with grooves 79 from which lead openings 77 which cause liquid tending to pass into bearing 22 to be discharged through openings 77 into the rotor.

As shown in Fig. 5, the mixture-supply pipe 101 is provided with a pivoted butterfly valve 80 to which is connected a segmental gear 81 upon which acts spring 82, tending to swing valve 80 to its open position. Torque motor 83 through pinion 84 imposes a force acting upon the segmental gear 81 in a direction opposite to that in which acts spring 82. Current is supplied to torque motor 83 which is proportional to the current required by three-phase motor 37 as by current transformer 85. Various expedients may be resorted to for effecting the same proportioning of supply rate to power delivered.

In the operation of the construction shown in the drawings solids having mixed therewith liquid which may be composed of a single liquid or miscible liquids or immiscible liquids, are introduced into hopper 14 and pass into chamber 59 of the rotor, and are distributed by nozzles 64 in a zone of the rotor, which may be called a feeding zone, lying between the dam which determines the level of liquid in the decanting zone 45 and that portion of the rotor which is provided with perforations and which constitutes a straining zone. Preferably, the mixture is fed to that portion of the decanting zone which is nearest to the straining zone in order to minimize turbulence of the liquid in that part of the decanting zone which is nearest to dam 44 and about to be discharged from the rotor, and in order to reduce the distance through which the major portion of the solids must be advanced to their point of discharge over the upper edge of the rotor. In the decanting zone 45 the inner surface of the liquid will assume a level determined by the position of the inner edge of dam 44 and indicated by dot—dash line 90. As a result of centrifugal force, heavy solids will move by "sedimentation" to the outer portion of decanting zone 45 and the differential rotation of inner member 54 will cause plows 71 to advance the solids upwardly along the inner face of the rotor toward and eventually to their point of discharge over the upper edge of the rotor. Liquid occupying the inner portion of decanting zone 45 will be continuously discharged over dam 44 and will be collected in collecting receptacles 51 and pass therefrom through pipe 16. In the removal of liquor from ammonium sulphate, tar will float upon the liquid in decanting zone 45 and pass therefrom with the liquid instead of being caught on the crystals and ultimately imparting a dark color thereto as in the case of removal of such liquor by a mere straining operation in which the liquor passes through the cake of crystals on the rotor wall and the tar adheres thereto. Solid particles may be caused to remain in suspension in the liquid in decanting zone 45 and discharged therefrom with the liquid and so separated from the solids discharged over the upper edge of the rotor. This may be accomplished by controlling the degree of agitation of the contents of the decanting zone, as by regulating the speed or agitating effect of plows or other parts moved in that zone or regulating the rate of feed of mixture thereto. Examples of solids which may be carried out in suspension are calcium and magnesium carbonate and calcium sulphate, in the separation of sodium chloride crystals from brine, gluten in the separation of brewers' grains or starch from water, fine particles in the separation of tri-sodium phosphate crystals from solution, and abraded particles of crystals and impurities in the separation of ammonium sulphate from acid liquor.

As the solids are advanced over the frusto-conical surface after they are withdrawn from the liquid in the decanting zone, wash-liquid such as water or any suitable liquid is applied to them through nozzles 66 and the divergence of the frusto-conical wall causes the liquid to flow toward the decanting zone and away from the straining zone and the upwardly advanced solids are thereby subjected to countercurrent washing under the action of centrifugal force and the most extensively washed solids are encountered only by pure or relatively less contaminated wash-liquid. The plowing of the solids causes wash-liquid to pass through the body of solids instead of over it. All solids are eventually washed with pure liquid as contrasted with an attempt to wash a cake of solids which has been built up in a batch operation of a simple centrifugal strainer, in which case only the innermost layer of solids is ever contacted with pure wash-liquid and the outer layers of solids are contacted only with liquid contaminated by previous contact with inner layers of solids. It is to be noted that wash-liquid chamber 65 is provided with an overflow passage 91 positioned radially outward of lip 92 in order that liquid supplied through pipe 96 in excess of what is discharged through nozzles 66 will escape through passages 91 and will not discharge over lip 92 into engagement with the dried solids discharging over the top edge of the rotor. Excess liquid disposed of through passages 91 flows down the inner face of inner member 54 and into decanting compartment 45.

The plows which advance solids upward in the rotor effect a turning over of the material and by the time it reaches the straining zone it is relatively dry and there is a relatively small flow of liquid through the solids lying on the perforated surface comprising the straining zone and a relatively small quantity of fine particles is carried through the openings 47 by liquid flowing through the solids. Fine particles passing through perforations 47 of the straining zone are likely to be desirable solids and the substances discharged through those perforations are collected and are withdrawn through pipe 15 and may be passed back into the centrifugal rotor as by pump 94 or returned to the most suitable point of the operations wherein the mixture to be separated is produced.

Solids discharged from the rotor are deflected from their usual path in a plane normal to the axis of rotation, and they are not caused to stick on the sidewall of the enclosure, but are caused to make a relatively longer free flight and their downward movement causes a down draft in the enclosure through openings 95 in cover 12 and further drying is thereby effected. The solids pass out of the bottom of the enclosure and are collected in any manner, as by passing through hopper 17 to a conveyor.

In the separation of di- or tri-sodium phosphate crystals from solution in accordance with this invention the mixture may be introduced into the rotor directly from a crystallizer without intervention of any classifying or washing step and then the undesirably fine particles are held in suspension in and discharged with the solution flowing over dam 44, and solids containing less than 10% of fine particles are obtained while using only about $\frac{1}{15}$ of the washing liquid required in ordinary recovery of di- and tri-sodium phosphate crystals by classifying and then washing them in a settling tank and drying them in a batch-operated centrifugal strainer.

If the solids to be recovered are lighter than the liquid the rotor may be provided with an annular partition 99 carried by dam 44 and forming therewith a passage 100 leading from a radially outward portion of decanting chamber 45 and providing for the discharge of liquid freed of solids or containing certain solids in suspension.

While the construction shown in the drawings has been described in considerable detail it is to be understood that the construction described is merely illustrative and that numerous modifications thereof may be made within the spirit of this invention. In this connection, it is to be noted that while a frusto-conical rotor possesses numerous advantages, that shape is not indispensible and other shapes may be employed. The frusto-conical shape facilitates removal of solids from the decanting zone and facilitates the effecting of countercurrent washing of solids, but the rotor wall in the decanting and washing zone may assume other shapes; and in the straining zone the wall may assume various shapes, for example, it may be cylindrical or it may diverge toward the point at which solids are discharged from the rotor in accordance with the teachings of Sharples Patent No. 1,829,547. Likewise, other modifications may be made of which an example would be the omission of the passages through the rotor wall in the straining zone and the consequent omission of the straining step. Also, the internal diameter of dam 44 may be large enough to leave a wider clear frusto-conical surface to which mixture is fed between the decanting and straining zones.

I claim:

1. In the centrifugal separation of solids from a mixture thereof with liquid, the steps comprising continuously introducing the mixture into the influence of centrifugal force and thereby subjecting the mixture to sedimentation while separately discharging from the influence of centrifugal force liquid separated from the solids, continuously withdrawing solids from the substances undergoing sedimentation and subjecting the withdrawn solids to centrifugal straining, separately collecting liquid removed from the solids by straining, and returning said last-named liquid to the influence of the centrifugal force acting on the mixture.

2. In a centrifugal machine, a rotor mounted for rotation, means for advancing solids along the wall of said rotor, means for supplying a mixture of solids and liquid to the interior of said rotor, a prime mover for said rotor and advancing means, and means for controlling the rate of supply of mixture proportionately to the power delivered by said prime mover.

3. In a centrifugal machine, a rotor mounted for rotation, a pipe for delivering a mixture of solids and liquid to the interior of said rotor, means for advancing solids along the wall of said rotor, a prime mover for said rotor and said advancing means, a spring-opened valve in said pipe, and means tending to close said valve against the tension of said spring and acting in proportion to the power delivered by said prime mover.

4. In a centrifugal machine, a rotor mounted for rotation, a member mounted within said rotor for differential rotation with respect thereto and having an internal liquid passage, and a plurality of pockets carried by said member for controlling flow of wash-liquid from said passage toward the wall of said rotor, said pockets being open in the direction of rotor rotation and controlled by weirs.

5. In a centrifugal machine, a rotor mounted for rotation and comprising a frustro-conical outer wall, a decanting surface extending radially inwardly from a larger diameter of said wall and communicating directly with the atmosphere surrounding said wall through a zone of larger diameter than a portion of said wall longitudinally spaced from the decanting zone, a straining surface associated with said frustro-conical outer wall and having a diameter smaller than the diameter of the discharging portion of the aforementioned decanting surface, means for continuously feeding a mixture of solids and liquids to the portion of said frustro-conical wall adjacent said decanting surface during the rotation of the rotor and means for continuously feeding solids from which liquids have been partially removed by passage over said decanting surface axially of the rotor in opposition to the influence of centrifugal force from the zone of feed to the rotor to and beyond said straining surface and continuously discharging from the rotor, during feed of mixture thereto, solids from which liquids have been removed in said decanting zone and through said straining surface.

NATHANIEL BREWER.